United States Patent
Yoon et al.

(10) Patent No.: US 12,095,298 B2
(45) Date of Patent: Sep. 17, 2024

(54) APPARATUS FOR MANAGEMENT OF A BATTERY, VEHICLE SYSTEM HAVING THE SAME AND METHOD THEREOF

(71) Applicants: Hyundai Motor Company, Seoul (KR); Kia Corporation, Seoul (KR)

(72) Inventors: Joon Keun Yoon, Ulsan (KR); Seung Beom Yoon, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 45 days.

(21) Appl. No.: 17/323,140

(22) Filed: May 18, 2021

(65) Prior Publication Data

US 2022/0060037 A1    Feb. 24, 2022

(30) Foreign Application Priority Data

Aug. 21, 2020 (KR) .................. 10-2020-0105369

(51) Int. Cl.
*H02J 7/00* (2006.01)
*B60L 53/10* (2019.01)
*B60L 58/12* (2019.01)
*B60L 58/16* (2019.01)

(52) U.S. Cl.
CPC ............ *H02J 7/0047* (2013.01); *B60L 53/10* (2019.02); *B60L 58/12* (2019.02); *B60L 58/16* (2019.02); *H02J 7/00302* (2020.01); *B60L 2240/545* (2013.01); *B60L 2240/547* (2013.01)

(58) Field of Classification Search
CPC ..................................................... H02J 7/007
See application file for complete search history.

(56) References Cited

U.S. PATENT DOCUMENTS

| | | | | |
|---|---|---|---|---|
| 2009/0243555 A1* | 10/2009 | Tominaga | ............. | H02J 7/0013 702/63 |
| 2017/0250548 A1* | 8/2017 | Eo | ............... | H02J 7/007194 |
| 2018/0145531 A1* | 5/2018 | Jung | ................... | H02J 7/005 |
| 2018/0188329 A1* | 7/2018 | Huang | ............... | G01R 31/3648 |
| 2019/0190277 A1* | 6/2019 | Jung | ................. | H01M 10/44 |
| 2019/0202299 A1* | 7/2019 | Oh | ....................... | H01M 10/443 |
| 2019/0232815 A1* | 8/2019 | Hokoi | ................... | B60W 10/08 |
| 2020/0136399 A1 | 4/2020 | Akaishi | | |
| 2020/0212684 A1* | 7/2020 | Campbell | ........... | H01M 10/425 |
| 2020/0377073 A1* | 12/2020 | Oiwa | ..................... | B60L 3/0038 |
| 2021/0043894 A1* | 2/2021 | Cornelli | ............ | H02J 7/007194 |

FOREIGN PATENT DOCUMENTS

JP        2020068639 A     4/2020

* cited by examiner

*Primary Examiner* — Drew A Dunn
*Assistant Examiner* — Tynese V McDaniel
(74) *Attorney, Agent, or Firm* — MCDONNELL BOEHNEN HULBERT & BERGHOFF LLP (57) ABSTRACT

The present disclosure relates to a battery management apparatus, a vehicle system including the same, and a battery management method. An exemplary embodiment of the present disclosure provides a battery management apparatus including: a processor configured to create a profile depending on a voltage of a battery cell when charging a battery, to determine uniformity of the battery cell based on the profile, and to perform battery management and control by using the uniformity; and a storage configured to store a profile for each battery cell, and an algorithm and data driven by the processor.

17 Claims, 10 Drawing Sheets

| Division | Item No | TEST NAME | Spec |
|---|---|---|---|
| Main performance | 1 | Rated capacity | Xx Ah |
| | 2 | Room temperature resistance | Xx |
| | 3 | Low temperature resistance | Xx mΩ |
| | 4 | HPPC Output | Xxx W/kg |
| | 5 | Discharge output at room temperature for 15 s | Xxx W |
| | 6 | Charge output at room temperature for 15 s | Xx W |
| | 7 | Discharge output at low temperature | Xx W |
| | 8 | Charge/discharge by rate | Xxx |
| | 9 | Uniformity | > 80 |

APPARATUS FOR MANAGEMENT OF A BATTERY, VEHICLE SYSTEM HAVING THE SAME AND METHOD THEREOF

CROSS-REFERENCE TO RELATED APPLICATION

This application claims priority to and benefits of Korean Patent Application No. 10-2020-0105369 filed in the Korean Intellectual Property Office on Aug. 21, 2020, the entire contents of which are incorporated herein by reference.

FIELD

The present disclosure relates to a battery management apparatus, a vehicle system including the same, and a method thereof, and more particularly, to a technique for managing a battery based on uniformity by evaluating uniformity of the battery.

BACKGROUND

In the case of an electric vehicle or a hybrid vehicle, a high-voltage battery that stores driving energy is mounted. The high-voltage battery is charged and discharged, an internal material of the battery is non-uniformly charged and discharged during charging and discharging, and non-uniformity of the internal material of the battery becomes worse during high energy and rapid charging.

However, since a current battery control does not consider the uniformity within the battery, there are problems such as deterioration of lifespan and performance of the battery, or a fire of unknown cause.

In addition, with a recent increase in the use of high energy batteries and fast charging batteries, the non-uniformity of the battery is further maximized, and accordingly, there is a need for a technique to evaluate and utilize the non-uniformity of the battery.

The above information disclosed in this Background section is only for enhancement of understanding of the background of the disclosure, and therefore, it may contain information that does not form the prior art that is already known in this country to a person of ordinary skill in the art.

SUMMARY

An exemplary embodiment of the present disclosure is to provide a battery management apparatus, a vehicle system including the same, and a method thereof, capable of optimally managing a battery by evaluating and using uniformity of the battery.

The technical objects of the present disclosure are not limited to the objects mentioned above, and other technical objects not mentioned can be clearly understood by those skilled in the art from the description of the claims.

An exemplary embodiment of the present disclosure provides a battery management apparatus including: a processor configured to create a profile depending on a voltage of a battery cell when charging a battery, to determine uniformity of the battery cell based on the profile, and to perform battery management and control by using the uniformity; and a storage configured to store a profile for each battery cell, and an algorithm and data driven by the processor.

In an exemplary embodiment, the processor may create the profile based on a value obtained by dividing a capacity change amount by a voltage change amount during charging or discharging of the battery cell.

In an exemplary embodiment, the profile for each battery cell may be stored by mapping it to a C-rate, which is an amount of current that can fully charge the battery for a predetermined time.

In an exemplary embodiment, the processor may estimate the C-rate by comparing a profile created when the battery is charged with the profile for each battery cell stored in the storage, and determines uniformity depending on the C-rate.

In an exemplary embodiment, the uniformity may decrease as the C-rate increases.

In an exemplary embodiment, the processor may determine the uniformity by using a peak width of the profile depending on the voltage of the battery cell.

In an exemplary embodiment, the processor may determine the uniformity based on a peak of the profile depending on a voltage measured in charging or discharging with a low current.

In an exemplary embodiment, the processor may include determining an upper limit and a lower limit of the voltage for charging and discharging the battery depending on the uniformity.

In an exemplary embodiment, the processor may determine an upper limit and a lower limit of the voltage for each battery cell depending on the uniformity of each battery cell.

In an exemplary embodiment, the processor may determine an upper limit and a lower limit of the voltage for charging and discharging the battery cells based on a cell having lowest uniformity among the battery cells.

In an exemplary embodiment, the processor may determine that performance or quality of the battery is good when the uniformity is greater than or equal to a predetermined threshold value in evaluating the performance or quality of the battery.

In an exemplary embodiment, the processor may estimate a deterioration degree of the battery by using a change in C-rates of the battery cells.

In an exemplary embodiment, the processor may estimate that the deterioration degree of the battery has progressed as the C-rate increases when the C-rate increases.

An exemplary embodiment of the present disclosure provides a vehicle system including: a battery configured to have a voltage that is charged or discharged to drive a vehicle; a sensor configured to measure the voltage of the battery; and a processor configured to create a profile depending on a voltage of a battery cell when charging the battery, to determine uniformity of the battery cell based on the profile, and to perform battery management and control by using the uniformity.

An exemplary embodiment of the present disclosure provides a battery management method including: generating a profile depending on a voltage of a battery cell in charging a battery; determining uniformity of the battery cell based on the profile; and performing of the management and control of the battery by using the uniformity.

In an exemplary embodiment, the creating of the profile may create the profile based on a value obtained by dividing a capacity change amount by a voltage change amount during charging or discharging of the battery cell.

In an exemplary embodiment, the determining of the uniformity of the battery cell may include estimating a C-rate and determining uniformity depending on the C-rate by comparing a profile generated during the charging with a profile for each battery cell stored by mapping it to the C-rate, which is an amount of current that can fully charge the battery for a predetermined time.

In an exemplary embodiment, the determining of the uniformity of the battery cell may include estimating a C-rate and determining uniformity depending on the C-rate by comparing a profile generated during the charging with a profile for each battery cell stored by mapping it to the C-rate, which is an amount of current that can fully charge the battery for a predetermined time.

In an exemplary embodiment, the performing of the management and control of the battery by using the uniformity may include determining an upper limit and a lower limit of the voltage for charging and discharging the battery depending on the uniformity.

In an exemplary embodiment, the performing of the management and control of the battery by using the uniformity may estimate a deterioration degree of the battery by using a change in C-rates of the battery cells.

This technique may evaluate the uniformity of the battery and optimally manage the battery using the uniformity of the battery.

In addition, various effects that can be directly or indirectly identified through this document may be provided.

DETAILED DESCRIPTION

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

The present disclosure discloses a technique capable of increasing efficiency of a battery by evaluating uniformity of a high voltage battery of the vehicle and managing the battery based on the uniformity.

Hereinafter, exemplary embodiments of the present disclosure will be described in detail with reference to FIG. 1 to FIG. 10.

Figure 1:
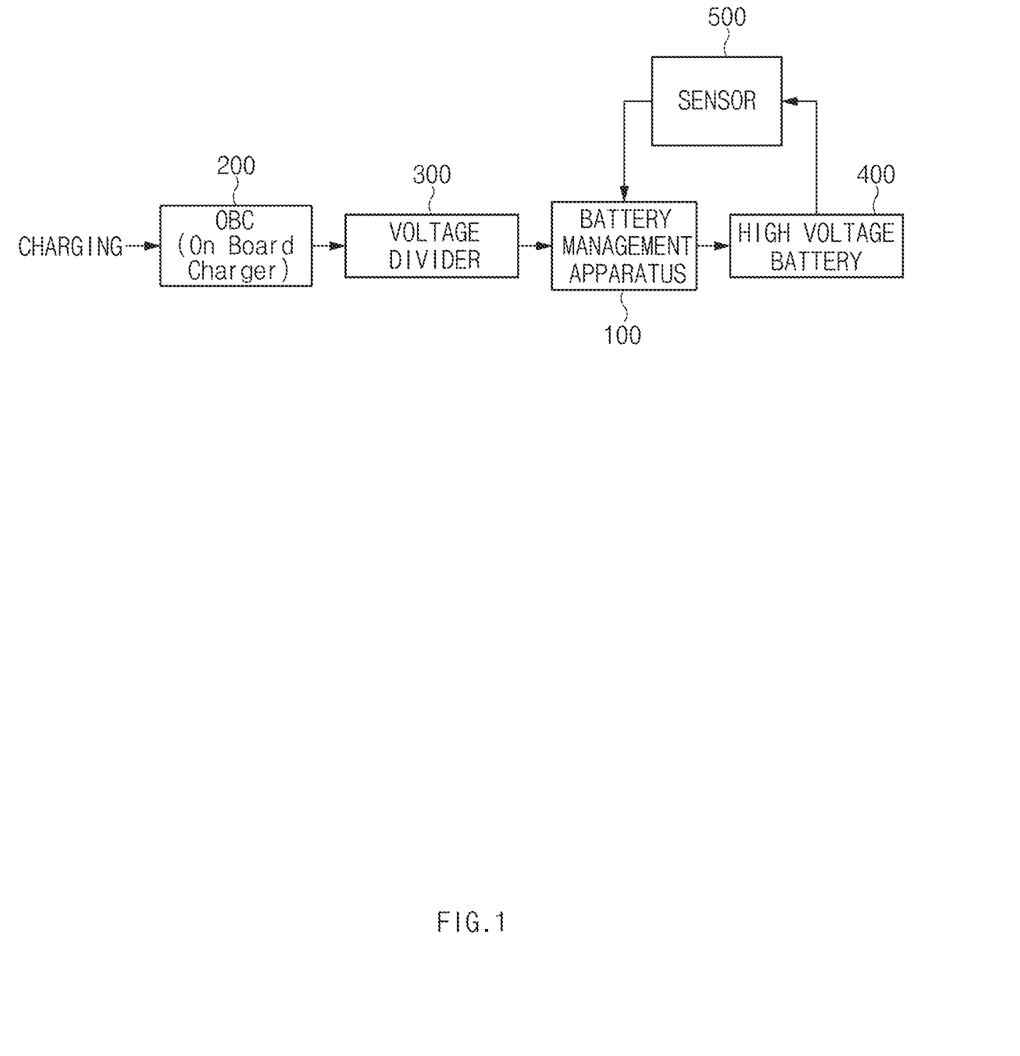
FIG. 1 illustrates a schematic diagram of a vehicle system including a battery management apparatus according to an exemplary embodiment of the present disclosure.
Figure 2:
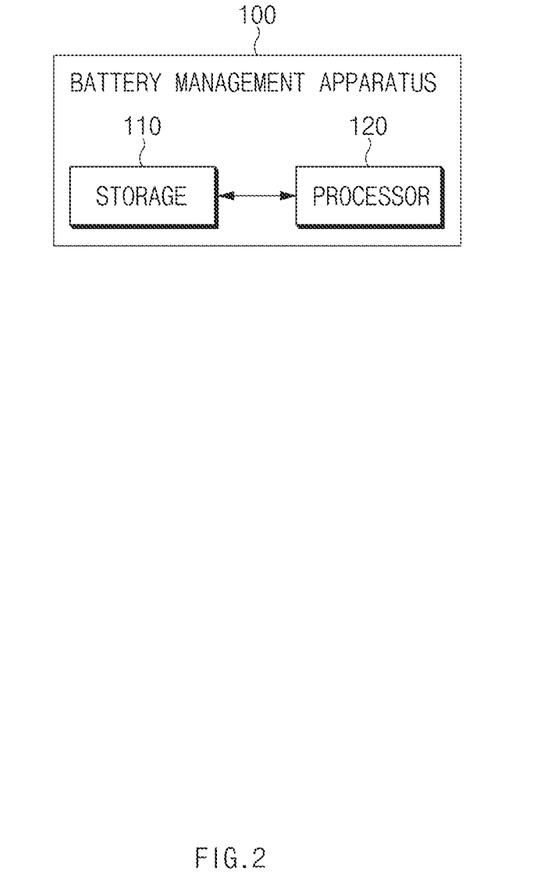
FIG. 2 illustrates a detailed schematic diagram of a battery management apparatus according to an exemplary embodiment of the present disclosure.

FIG. 1 illustrates a schematic diagram of a vehicle system including a battery management apparatus according to an exemplary embodiment of the present disclosure, and FIG. 2 illustrates a detailed schematic diagram of a battery management apparatus according to an exemplary embodiment of the present disclosure.

Referring to FIG. 1, a vehicle system according to an exemplary embodiment of the present disclosure includes a battery management apparatus 100, an on board charger (OBC) 200, a voltage divider 300, a high voltage battery 400, and a sensor 500. In this case, the vehicle system may be an eco-friendly vehicle that charges and discharges batteries, and the eco-friendly vehicle may include an electric vehicle (EV), a hybrid vehicle, and a plug-in hybrid car.

The battery management apparatus 100 is a battery management system (BMS), and performs battery control and management. That is, the battery management apparatus 100 may determine a state of the battery using a voltage, a current, and temperature of the battery 400 measured by the sensor 500, and the state of the battery 400 may include at least one of a state of charge (SOC), a state of health (SOH), and a temperature of the battery.

In particular, according to the present exemplary embodiment, the battery management apparatus 100 may create a profile for each cell of the battery 400 using the voltage of the battery 400 to evaluate uniformity for each battery cell. In addition, the battery management apparatus 100 may control and manage the battery by using the uniformity of the battery.

The OBC 200 converts or boosts an AC voltage inputted through a charging plug of the vehicle into a DC voltage (DC), and then transfers it to the voltage divider 300.

The voltage divider 300 distributes the voltage received from the OBC 200 and transfers it to the battery management apparatus 100.

The high voltage battery 400 charges or discharges a voltage for driving a vehicle.

The sensor 500 senses the voltage, the current, and the temperature of the battery 400, and transfers it to the battery management apparatus 100.

The battery management apparatus 100 according to the exemplary embodiment of the present disclosure may be implemented inside the vehicle. In this case, the battery management apparatus 100 may be integrally formed with internal control units of the vehicle, or may be implemented as a separate device to be connected to control units of the vehicle by a separate connection means.

According to the present exemplary embodiment, the battery management apparatus 100 which is operated as the above may be implemented in a form of an independent hardware device including a memory and a processor that processes each operation, and may be driven in a form included in other hardware devices such as a microprocessor or a general purpose computer system.

Referring to FIG. 2, the battery management apparatus 100 may include a storage 110 and a processor 120.

The storage 110 may store information for battery management and control, information for evaluating the uniformity of the battery and data obtained by the processor 120, data and/or algorithms required for the processor 120 to operate, and the like.

As an example, the storage 110 may store a profile for each C-rate, a profile for each uniformity, and battery status information. In this case, the C-rate is a current rate, which indicates an amount of current charging or discharging the battery for 1 hour. The capacity of the battery may be generally expressed as 1 C, e.g., a fully charged battery of 1 Ah may discharge 1A for 1 hour, and discharging the battery at 0.5 C indicates discharging at 500 mA, in which case it may discharge for 2 hours. In addition, discharging the battery at 2 C indicates discharging at 2 A and indicates that it may be discharged for 30 minutes.

As an example, the storage 110 may store a profile table with C-rate or uniformity mapped to a profile created based on a value obtained by dividing a change in capacity by a change in voltage when charging or discharging a battery cell. In this case, as the C-rate increases, the uniformity decreases.

The storage 110 may include a storage medium of at least one type among memories of types such as a flash memory, a hard disk, a micro, a card (e.g., an secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 120 may be electrically connected to the storage 110, the battery 400, the sensor 500, and the like, may electrically control each component, and may be an electrical circuit that executes software commands, thereby performing various data processing and calculations described below. The processor 120 may be, e.g., an electronic control unit (ECU), a micro controller unit (MCU), a hybrid controller unit (HCU), or other subcontrollers mounted in the vehicle.

Figure 3:
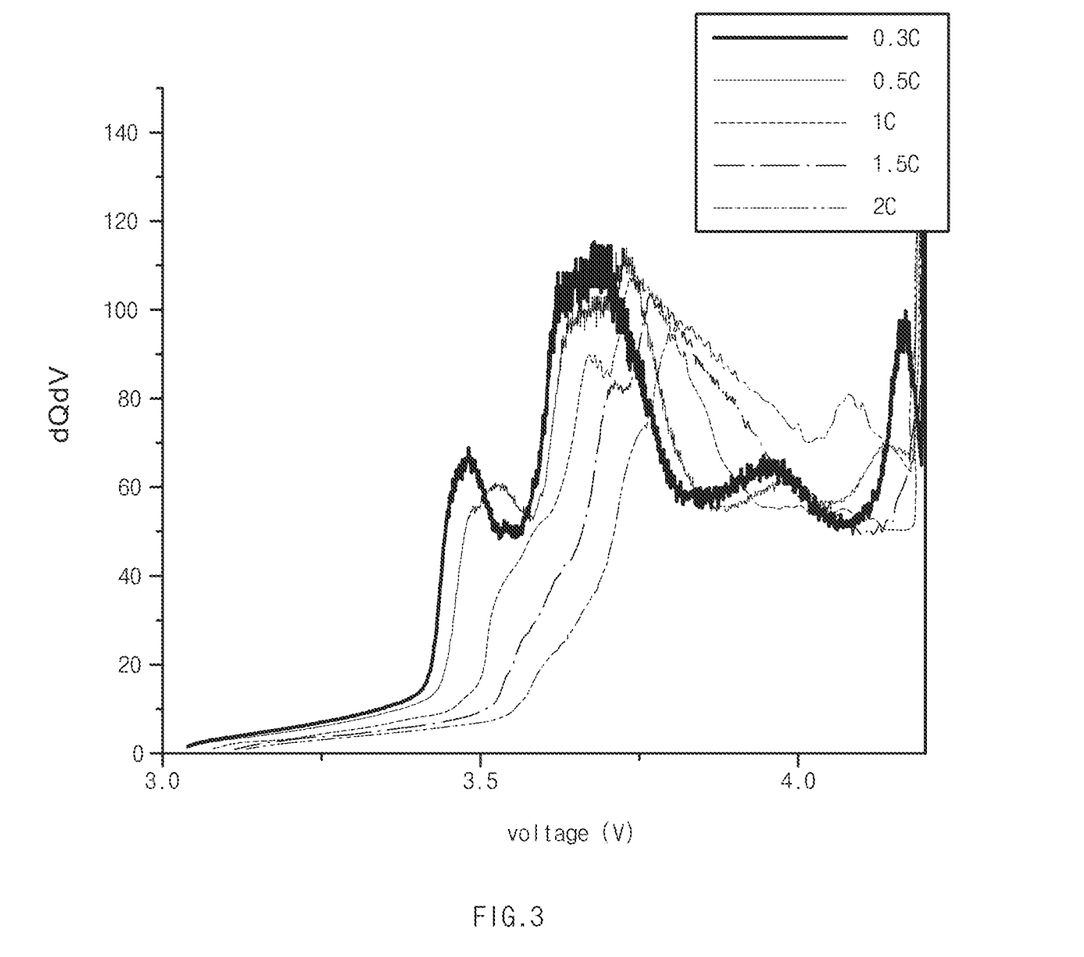
FIG. 3 illustrates a profile for each C-rate of a battery cell according to an exemplary embodiment of the present disclosure.

The processor 120 may create a profile as shown in FIG. 3 by measuring a voltage of the battery cell. FIG. 3 illustrates a profile for each C-rate of a battery cell according to an exemplary embodiment of the present disclosure.

Referring to FIG. 3, a profile for each C-rate of a battery cell is created depending on a voltage v and dQdv. dQdv is a value obtained by dividing the capacity change amount by the voltage change amount when charging or discharging the battery. In FIG. 3, profiles with C-rates of 0.3 C, 0.5 C, 1 C, 1.5 C, and 2 C are shown.

The processor 120 may create a profile depending on a voltage of a battery cell when charging the battery, may determine uniformity of the battery cell based on the profile, and may perform battery management and control by using the uniformity.

The processor 120 may create a profile based on a value dQdV obtained by dividing the capacity change amount by the voltage change amount when charging or discharging the battery cell.

The processor 120 may estimate a C-rate by comparing a profile created during battery charging with a profile for each battery cell stored in the storage 110, and may determine uniformity depending on the C-rate. In this case, as the C-rate increases, the uniformity decreases.

Figure 5:
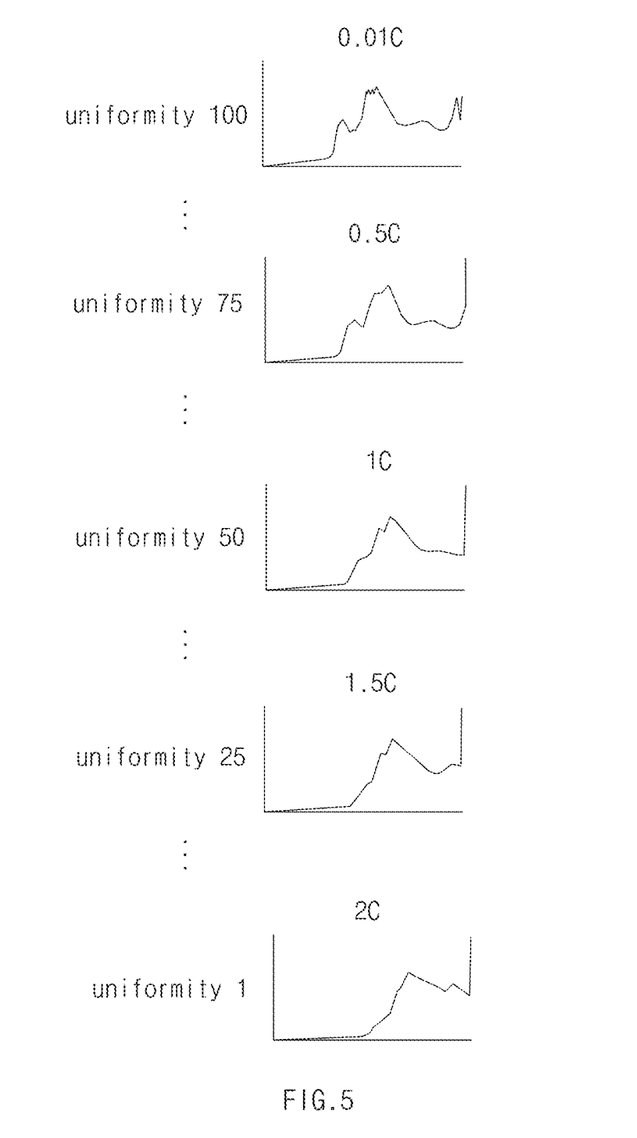
FIG. 5 illustrates a profile for each battery cell according to an exemplary embodiment of the present disclosure.

When the battery pack includes N cells, the processor 120 may create a profile depending on a C-rate or uniformity for each of the N cells of the battery pack in advance and store it in the storage 110. FIG. 5 illustrates a profile for each battery cell according to an exemplary embodiment of the present disclosure. Referring to FIG. 5, when there are 100 cells in the battery pack, 100 uniformity profiles may be created and stored. For example, when the C-rate is 0.01 C, the uniformity may be 100, when the C-rate is 1 C, the uniformity may be 50, and when the C-rate is 2 C, uniformity 1 may be matched and stored in advance. Accordingly, the processor 120 may create a profile when charging the battery cell, and may search for a same profile as the created profile from the profile table stored in the storage 110 to read C-rate and uniformity information for the same profile.

Figure 4:
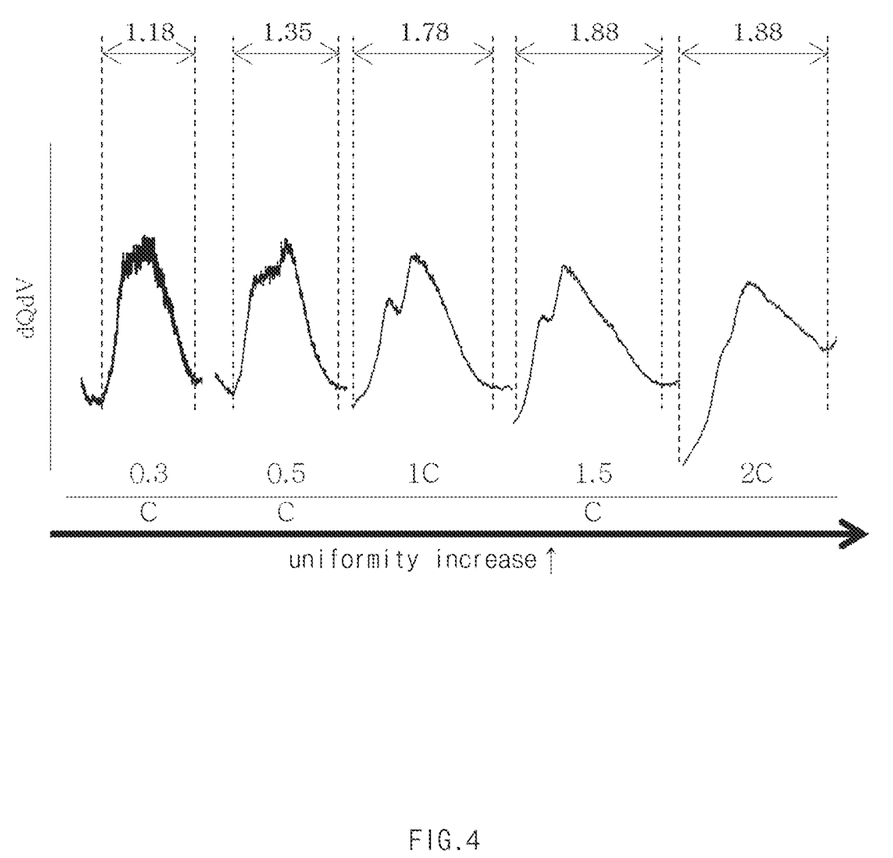
FIG. 4 illustrates a peak width for each battery cell according to an exemplary embodiment of the present disclosure.

The processor 120 may determine the uniformity by using a peak width of a profile depending on a voltage of a battery cell. FIG. 4 illustrates a peak width for each battery cell according to an exemplary embodiment of the present disclosure. Referring to FIG. 4, cells constituting a battery pack have their own dQdV peaks. In this case, non-uniformity can be minimized during charging and discharging of the battery with a low current, and thus the dQdV peaks at the time of charging and discharging with the low current can be set as a reference value with best uniformity. Accordingly, non-uniformity of cells to be evaluated can be evaluated by comparing the dQdV peaks when charging and discharging with the low current and dQdV when charging and discharging the cells to be evaluated. In this case, it can be seen that the C-rate increases as the cell profile dQdV peak width increases, and the non-uniformity increases as the C-rate increases.

Accordingly, the processor 120 may create a dQdV profile by measuring a voltage of the battery cell, and may obtain the C-rate by measuring a peak width of the profile to determine a degree of non-uniformity through the C-rate.

The processor 120 may determine uniformity based on a peak of a profile depending on a voltage measured when charging or discharging at a low current.

The processor 120 may determine an upper limit and a lower limit of a voltage for charging and discharging the battery depending on uniformity.

The processor 120 may determine an upper limit and a lower limit of the voltage for each battery cell according to the uniformity for each battery cell. In addition, the processor 120 may determine an upper limit and a lower limit of a voltage for charging and discharging the battery cells based on a cell having lowest uniformity among battery cells.

In evaluating performance or quality of the battery, the processor 120 may determine that the performance or quality is good when the uniformity is equal to or greater than a predetermined threshold value.

The processor 120 may estimate a degradation degree of the battery by using a change in the C-rate of the battery cells. That is, when the C-rate increases, the processor 120 may estimate that the battery deteriorates as the C-rate increases.

Figure 6:
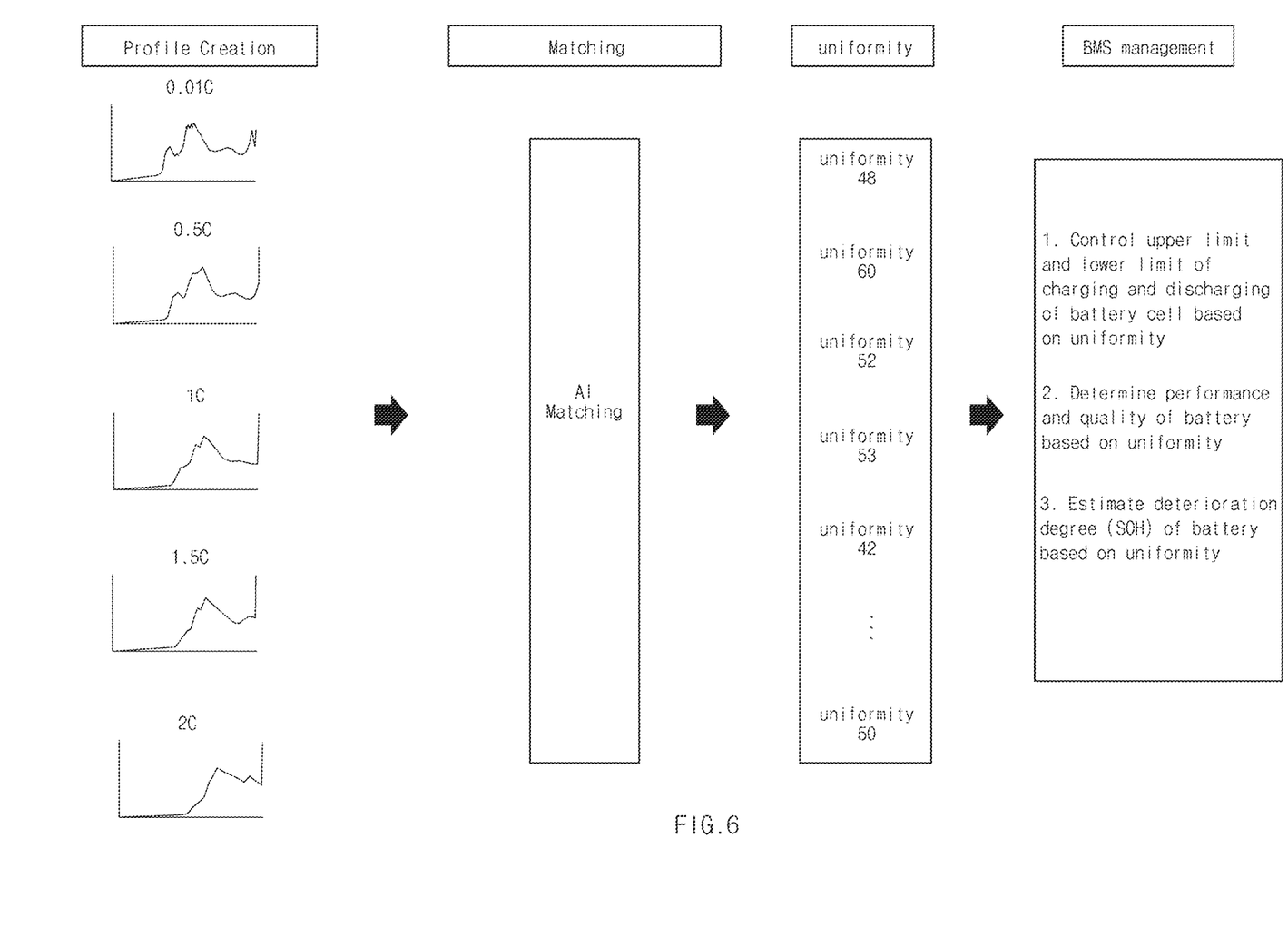
FIG. 6 illustrates a schematic diagram for generally describing a uniformity-based battery management method according to an exemplary embodiment of the present disclosure.

FIG. 6 illustrates a schematic diagram for generally describing a uniformity-based battery management method according to an exemplary embodiment of the present disclosure.

Referring to FIG. 6, the processor 120 calculates dQdV by measuring a voltage of a battery cell each time it is charged, so as to create a profile.

Then, the processor 120 compares and matches a profile table stored in the storage 110 with a profile created during charging. In this case, the processor 120 may perform profile matching by using artificial intelligence or a learning algorithm.

Accordingly, when uniformity information of corresponding cell is obtained through matching, the processor 120 sets the upper and lower limits of the voltage of the battery based on the uniformity information, may perform battery evaluation by adding uniformity information to the battery evaluation item, or may estimate the state of health (SOH) of the battery based on the uniformity information.

First, the processor 120 may determine an upper limit and a lower limit of the voltage for charging and discharging the battery by using the uniformity information.

The processor 120 may determine the upper limit and the lower limit of the voltage for charging and discharging in consideration of uniformity for each individual cell. For example, when the battery pack includes N cells, the upper and lower limits of the voltage for charging/discharging for every N cells may be determined depending on the uniformity for every N cells by evaluating the uniformity for every N cells.

In addition, the processor 120 may apply upper and lower limits for charging and discharging the battery cells to all cells in the battery pack based on the cell having the lowest uniformity. For example, when the battery pack includes N cells, the upper and lower limits of the voltage for charging and discharging the N cells may be equally determined as the upper and lower limits of the voltage for charging and discharging the cells with the lowest uniformity among the N cells by evaluating the uniformity for every N cells depending on the uniformity of the cell with the lowest uniformity among the N cells. For example, since the uniformity is 42 in FIG. 6, the upper and lower limits of the voltage of the corresponding cell may be applied to all cells.

Figure 7:
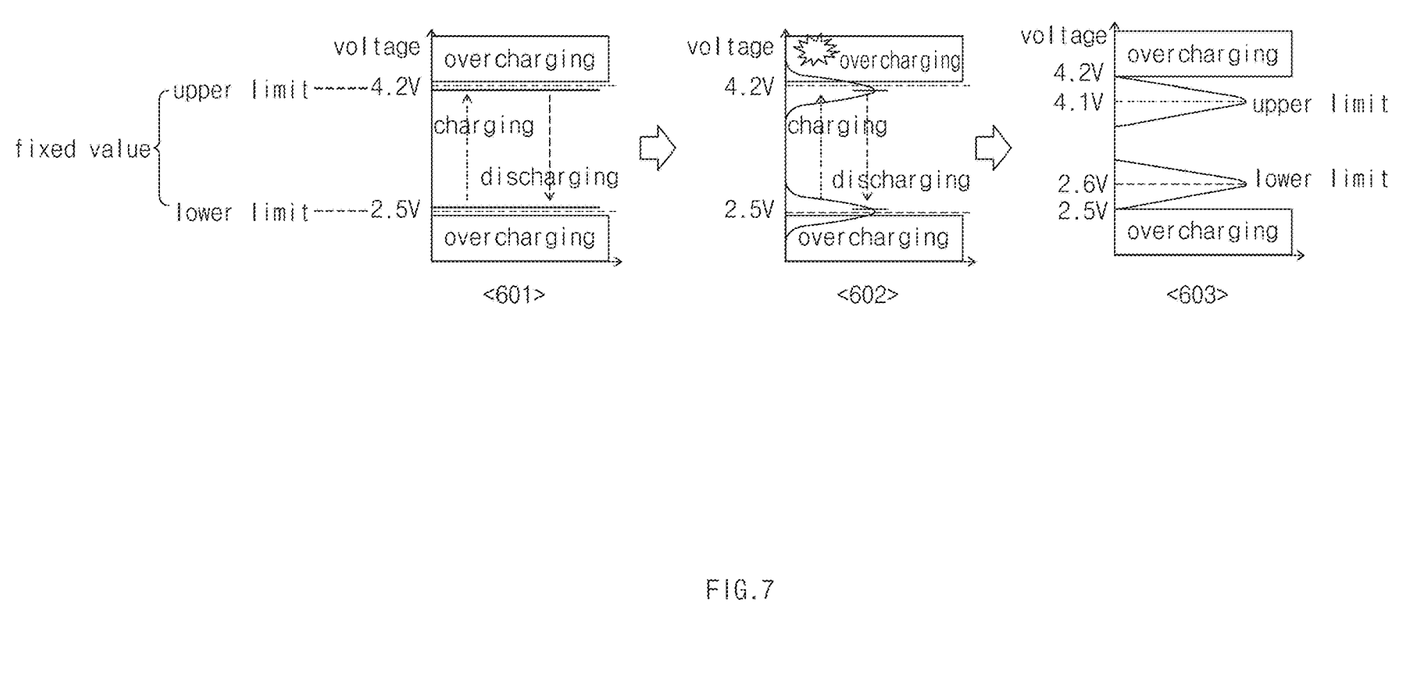
FIG. 7 illustrates an example of changing a voltage range setting of a battery based on uniformity according to an exemplary embodiment of the present disclosure.

FIG. 7 illustrates an example of changing a voltage range setting of a battery based on uniformity according to an exemplary embodiment of the present disclosure.

Referring to FIG. 7, the upper and lower limits of the charging voltage may be adjusted to prevent overcharging during battery charging. Conventionally, the upper limit for charging and discharging was 4.2 V and the lower limit therefor was 2.5 V as in a view 601, and there may be a case of overcharging due to non-uniformity of the battery as in a view 602, and thus the upper limit for charging and discharging may be lowered to 4.1V and the lower limit may be raised to 2.6V to prevent overcharging or overdischarging as in a view 603.

Second, the processor 120 may add uniformity information to an item for evaluating performance and quality of the battery.

Figure 8:
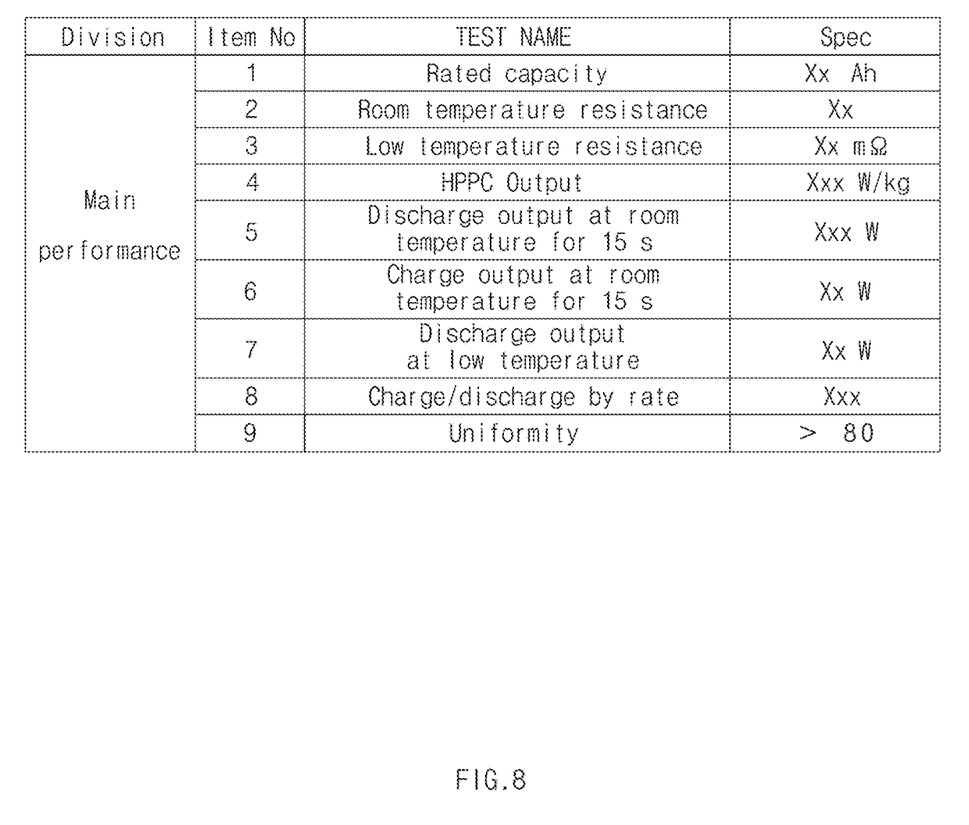
FIG. 8 illustrates an example of battery evaluation items including uniformity according to an exemplary embodiment of the present disclosure.

FIG. 8 illustrates an example of battery evaluation items including uniformity according to an exemplary embodiment of the present disclosure. Referring to FIG. 8, battery cell evaluation items include rated capacity, room temperature resistance, low temperature resistance, a HPPC output, a discharge output at room temperature for 15 seconds, a charge output at room temperature for 15 seconds, a discharge output at low temperature, and charge/discharge by rate, and battery performance is determined by adding uniformity to the items according to the disclosure.

When developing a battery cell, a coin cell for verifying a material with good uniformity may be manufactured, and a material with good uniformity may be selected by evaluating the charging and discharging of the coin cell and checking the profile. After making an actual cell using such a material having good uniformity, the uniformity may be determined by evaluating charge/discharge of the actual cell and checking the profile.

In this case, when uniformity is included in the evaluation items as illustrated in FIG. 8, cells may be designed considering uniformity from material and design stages, it may be more advantageous for developing battery products. For example, this is effective in developing good battery products by considering uniformity, such as designing to ensure at least 50 uniformity in a battery cell development stage.

In addition, in mass-producing batteries, when an activation process goes through a cell manufacturing process (electrode & assembly process), an actual cell is charged and discharged, and in this case, uniformity may be evaluated by checking a charge/discharge profile. For example, even when all items 1 to 8 in FIG. 8 are satisfied, if the uniformity exceeds 80, it may be determined as good.

Accordingly, cells whose uniformity is less than a reference value in a battery mass production stage may be determined to be defective, and thus defective cells in a manufacturing process and defects of currently manufactured mass-produced products may be determined.

Third, the processor 120 may estimate the degradation degree of the battery by using uniformity information. That is, as the battery ages, that is, as it is used, its capacity decreases and becomes non-uniform. In addition, if the battery is charged at a high C-rate, the capacity decreases and becomes non-uniform. However, when charging an electric vehicle, it is always charged with a same current value without considering battery aging. Even with the same current value, the C-rate felt by the battery varies with aging. For example, when a battery with a capacity of 100 Ah is charged with 50 A, it is charged with 0.5 C-rate. However, when a lifespan of the battery is reduced and the same 50 A is charged to the battery (50 Ah) in which the capacity is reduced by 50% compared to an initial capacity (SOH=50), it becomes 1 C-rate. Accordingly, when a profile is created in charging the battery, it will have a shape similar to that of the 1 C-rate charging profile. Thus, the C-rate of the corresponding battery cell may be estimated by inversely estimating which C-rate profile a shape of the profile corresponds to, and SOH may be estimated by calculating a current capacity depending on a change in C-rate.

For example, when initial capacity of the battery is charged with 50 Ah and 40 A, and the C-rate is 0.8 C, the processor 120 estimates a current C-rate by matching the measured cell profile with a profile for each C-rate of the storage 110. When the current C-rate is 1 C, the C-rate has been changed from 0.8 to 1, and thus it can be seen that the deterioration has progressed by 20%, and the SOH may be estimated to be 80.

Figure 9:
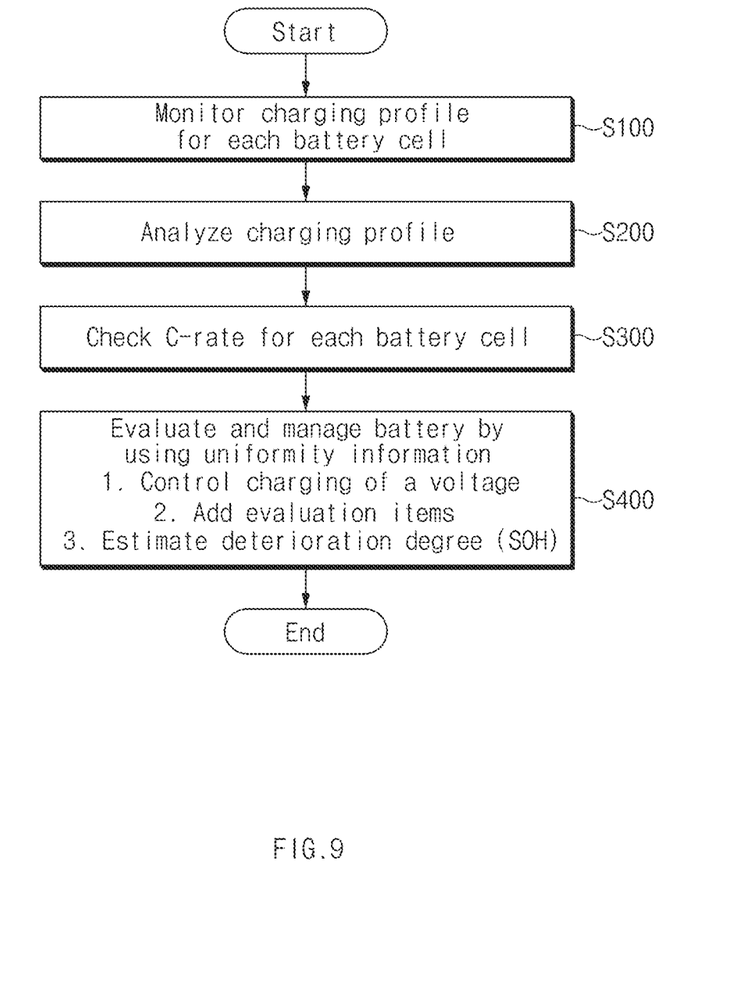
FIG. 9 illustrates a flowchart for describing a battery management method according to an exemplary embodiment of the present disclosure.

Hereinafter, a battery management method according to an exemplary embodiment of the present disclosure will be described in detail with reference to FIG. 9. FIG. 9 illustrates a flowchart for describing a battery management method according to an exemplary embodiment of the present disclosure.

Hereinafter, it is assumed that the battery management apparatus 100 of FIG. 1 performs a process of FIG. 9. In addition, in the description of FIG. 9, operations described as being performed by a device may be understood as being controlled by the processor 120 of the battery management apparatus 100.

Referring to FIG. 9, the battery management apparatus 100 monitors a charging profile for each battery cell of a vehicle (S100). That is, the battery management apparatus 100 measures the charging profile for each battery cell as illustrated in FIG. 5.

The battery management apparatus 100 compares and analyzes a profile for each cell pre-stored with a profile of the measured cell (S200), and when a matching profile exists, the C-rate of the profile is checked to determine uniformity (S300).

Accordingly, the battery management apparatus 100 evaluates and manages the battery by using determined uniformity information (S400).

That is, the battery management apparatus 100 may change a setting of a charging limit of the battery as illustrated in FIG. 7 depending on uniformity of the battery, may evaluate a state of the battery by adding uniformity to the evaluation item as illustrated in FIG. 8, or may estimate the SOH to determine the state of the battery.

As such, the present disclosure may prevent a fire accident of a battery, may prevent a decrease in battery lifespan, may secure a battery pre-quality, may set a direction for developing a battery, and may estimate a battery aging state by evaluating the uniformity of the battery and using the uniformity of the battery to more accurately control and manage the battery.

Figure 10:
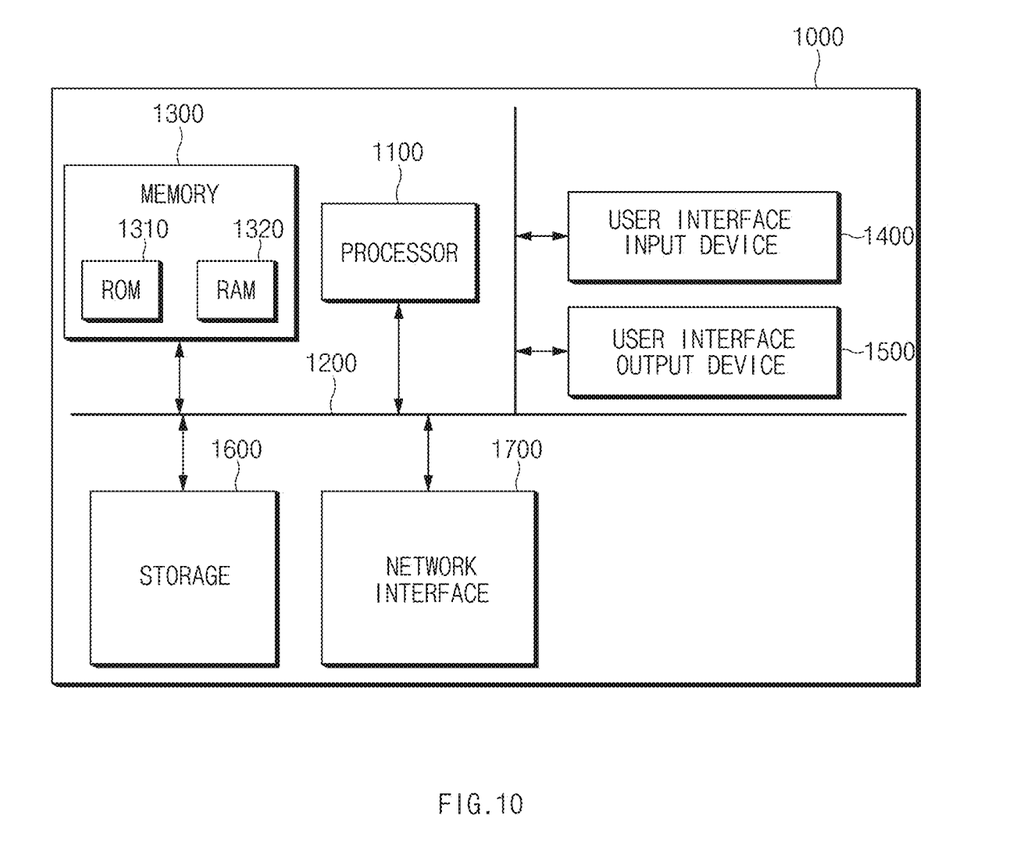
FIG. 10 illustrates a computing system according to an exemplary embodiment of the present disclosure.

FIG. 10 illustrates a computing system according to an exemplary embodiment of the present disclosure.

Referring to FIG. 10, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) and a random access memory (RAM).

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, a EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A battery management apparatus comprising:
   a processor configured to:
      create a profile depending on a voltage of a battery cell when charging a battery,
      compare the profile with a previously stored profile for the battery cell, to determine a C-rate, which is an amount of current that can fully charge the battery for a predetermined time,
      determine uniformity of internal material of the battery cell based on the C-rate, and
      perform battery management and control by determining an upper limit and a lower limit of the voltage for charging and discharging the battery depending on the uniformity of the internal material of the battery cell; and
   a storage configured to store a profile for the battery cell, and an algorithm and data driven by the processor.

2. The battery management apparatus of claim 1, wherein the processor creates the profile depending on the voltage of the battery cell based on a value obtained by dividing a capacity change amount by a voltage change amount during charging or discharging of the battery cell.

3. The battery management apparatus of claim 1, wherein the processor estimates the C-rate by comparing a profile created when the battery is charged with the profile for the battery cell stored in the storage, and determines uniformity of the internal material of the battery cell depending on the C-rate.

4. The battery management apparatus of claim 1, wherein the processor determines the uniformity by using a peak width of the profile depending on the voltage of the battery cell because the uniformity of the internal material of the battery cell is smaller as the C-rate is larger.

5. The battery management apparatus of claim 4, wherein the processor determines the uniformity of the internal material of the battery cell based on a peak of the profile depending on a voltage measured in charging or discharging with a low current.

6. The battery management apparatus of claim 1, wherein the processor determines an upper limit and a lower limit of the voltage for charging and discharging the battery depending on the uniformity of the internal material of the battery cell.

7. The battery management apparatus of claim 6, wherein the processor determines an upper limit and a lower limit of the voltage for the battery cell depending on the uniformity of the internal material of the battery cell.

8. The battery management apparatus of claim 6, wherein the processor determines an upper limit and a lower limit of the voltage for charging and discharging a plurality of battery cells based on a cell having a lowest uniformity of internal material among the plurality of battery cells.

9. The battery management apparatus of claim 1, wherein the processor determines that a deterioration degree of the battery is low when the uniformity of the internal material of the battery cell is greater than or equal to a predetermined threshold value in evaluating the performance or quality of the battery.

10. The battery management apparatus of claim 1, wherein the processor estimates a deterioration degree of the battery by using a change in C-rates of a plurality of battery cells.

11. The battery management apparatus of claim 10, wherein the processor estimates that the deterioration degree of the battery has progressed as the C-rate of the profile depending on a voltage of a battery cell is larger when the C-rate is larger.

12. A vehicle system comprising:
a battery configured to have a voltage that is charged or discharged to drive a vehicle;
a sensor configured to measure the voltage of the battery; and
a processor configured to:
create a profile depending on a voltage of a battery cell when charging the battery,
compare the profile with a previously stored profile for the battery cell, to determine a C-rate, which is an amount of current that can fully charge the battery for a predetermined time,
determine uniformity of the internal material of the battery cell based on the C-rate, and
perform battery management and control by determining an upper limit and a lower limit of the voltage for charging and discharging the battery depending on the uniformity.

13. A battery management method comprising:
creating a profile depending on a voltage of a battery cell in charging a battery;
comparing the profile with a previously stored profile for the battery cell, to determine a C-rate, which is an amount of current that can fully charge the battery for a predetermined time;
determining uniformity of the internal material of the battery cell based on the C-rate; and
performing management and control of the battery by determining an upper limit and a lower limit of the voltage for charging and discharging the battery depending on the uniformity of the internal material of the battery cell.

14. The battery management method of claim 13, wherein the creating of the profile depending on the voltage of the battery cell includes creating the profile based on a value obtained by dividing a capacity change amount by a voltage change amount during charging or discharging of the battery cell.

15. The battery management method of claim 13, wherein the determining of the uniformity of the internal material of the battery cell includes using a peak width of the profile depending on the voltage of the battery cell.

16. The battery management method of claim 13, wherein the performing of the management and control of the battery by using the uniformity of the internal material of the battery cell includes determining an upper limit and a lower limit of the voltage for charging and discharging the battery depending on the uniformity of the internal material of the battery cell.

17. The battery management method of claim 13, wherein the performing of the management and control of the battery by using the uniformity of the internal material of the battery cell includes estimating a deterioration degree of the battery by using a change in C-rates of a plurality of battery cells.

* * * * *